US009926871B2

(12) United States Patent
Alobiedat et al.

(10) Patent No.: US 9,926,871 B2
(45) Date of Patent: Mar. 27, 2018

(54) METHODS AND SYSTEMS FOR ESTIMATING AN AIR-FUEL RATIO WITH A VARIABLE VOLTAGE OXYGEN SENSOR

(71) Applicant: Ford Global Technologies, LLC, Dearborn, MI (US)

(72) Inventors: Lyth Alobiedat, Detroit, MI (US); Gopichandra Surnilla, West Bloomfield, MI (US); Daniel A. Makled, Dearborn, MI (US); Mohannad Hakeem, Dearborn, MI (US); Richard E. Soltis, Saline, MI (US); Michael McQuillen, Warren, MI (US); Stephen B. Smith, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 15/005,989

(22) Filed: Jan. 25, 2016

(65) Prior Publication Data

US 2017/0211495 A1    Jul. 27, 2017

(51) Int. Cl.
*F02D 41/14* (2006.01)
*F01N 13/00* (2010.01)
(Continued)

(52) U.S. Cl.
CPC ....... *F02D 41/1454* (2013.01); *F01N 13/008* (2013.01); *F02D 41/1441* (2013.01);
(Continued)

(58) Field of Classification Search
CPC .... F02D 41/1454; F02D 41/28; F01N 13/008; G01M 15/104
(Continued)

(56) References Cited

U.S. PATENT DOCUMENTS 5,706,654 A * 1/1998 Nagai ................. F02D 41/1441
123/674
6,567,738 B2 5/2003 Gopp et al.
(Continued)

OTHER PUBLICATIONS

Makled, Daniel A. et al., "Method for Humidity Measurement Enablement," U.S. Appl. No. 14/863,281, filed Sep. 23, 2015, 43 pages.
(Continued)

*Primary Examiner* — Joseph Dallo
*Assistant Examiner* — Yi-Kai Wang
(74) *Attorney, Agent, or Firm* — Julia Voutyras; McCoy Russell LLP (57) ABSTRACT

A method for an engine may comprise, responsive to a first condition comprising a reference voltage of a first exhaust oxygen sensor operating in variable voltage mode increasing above a threshold voltage, determining a change in an output of the first exhaust oxygen sensor corresponding to the increase in the reference voltage, correcting the output of the first oxygen sensor based on the output change, and adjusting engine operation based on the corrected output. In this way, the accuracy of air-fuel estimates based on the exhaust gas sensor can be preserved, and closed loop fuel control of the engine can be maintained even when the exhaust oxygen sensor is operating VVS mode, thereby reducing engine emissions, increasing fuel economy, and increasing vehicle drivability.

20 Claims, 5 Drawing Sheets

(51) Int. Cl.
*F02D 41/28* (2006.01)
*G01M 15/10* (2006.01)

(52) U.S. Cl.
CPC ..... *F02D 41/1458* (2013.01); *F02D 41/1486* (2013.01); *F02D 41/28* (2013.01); *G01M 15/104* (2013.01); *F02D 41/1456* (2013.01); *F02D 2041/281* (2013.01)

(58) Field of Classification Search
USPC ...................................................... 701/102
See application file for complete search history.

(56) References Cited

U.S. PATENT DOCUMENTS

| | | | |
|---|---|---|---|
| 8,354,016 B2 | 1/2013 | Kerns et al. | |
| 8,495,996 B2 | 7/2013 | Soltis et al. | |
| 8,522,760 B2 | 9/2013 | Soltis | |
| 8,731,806 B2 | 5/2014 | Soltis et al. | |
| 8,752,534 B2 | 6/2014 | Soltis | |
| 8,763,594 B2 | 7/2014 | Surnilla et al. | |
| 8,857,155 B2 * | 10/2014 | Surnilla | F01N 11/007 60/274 |
| 8,887,706 B2 | 11/2014 | Surnilla et al. | |
| 9,057,330 B2 | 6/2015 | Surnilla et al. | |
| 9,109,523 B2 | 8/2015 | Surnilla et al. | |
| 2002/0112467 A1 * | 8/2002 | Uranishi | F01N 11/007 60/277 |
| 2004/0098967 A1 * | 5/2004 | Cook | F02D 41/1441 60/274 |
| 2014/0202437 A1 * | 7/2014 | Surnilla | F02D 41/0055 123/568.22 |
| 2015/0027103 A1 | 1/2015 | Surnilla et al. | |
| 2015/0047339 A1 | 2/2015 | Rollinger et al. | |
| 2015/0075502 A1 | 3/2015 | Surnilla et al. | |
| 2015/0075503 A1 | 3/2015 | Surnilla et al. | |
| 2015/0101564 A1 | 4/2015 | Surnilla et al. | |
| 2015/0337749 A1 | 11/2015 | Surnilla et al. | |

OTHER PUBLICATIONS

Makled, Daniel A. et al., "Methods and Systems for Estimating Ambient Pressure Using an Oxygen Sensor," U.S. Appl. No. 14/997,309, filed Jan. 15, 2016, 49 pages.

* cited by examiner

METHODS AND SYSTEMS FOR ESTIMATING AN AIR-FUEL RATIO WITH A VARIABLE VOLTAGE OXYGEN SENSOR

FIELD

The present description relates generally to methods and systems for operating a variable voltage exhaust gas sensor of an internal combustion engine.

BACKGROUND/SUMMARY

An exhaust gas sensor (e.g., exhaust oxygen sensor) may be positioned in an exhaust system of a vehicle and operated to provide indications of various exhaust gas constituents. In one example, the exhaust gas sensor may be used to detect an air-fuel ratio of exhaust gas exhausted from an internal combustion engine of the vehicle. The exhaust gas sensor readings may then be used to control operation of the internal combustion engine to propel the vehicle. In another example, outputs of the exhaust gas sensor may be used to estimate a water content in the exhaust gas. Water content estimated using the exhaust gas oxygen sensor may be used to infer an ambient humidity during engine operation. Further still, the water content may be used to infer an alcohol content of a fuel burned in the engine. Under select conditions, the exhaust gas sensor may be operated as a variable voltage (VVs) oxygen sensor in order to more accurately determine exhaust water content. When operating in the VVs mode, a reference voltage of the exhaust gas sensor is increased from a lower, base voltage (e.g., approximately 450 mv) to a higher, target voltage (e.g., in a range of 900-1100 mV). In some examples, the higher, target voltage may be a voltage at which water molecules are partially or fully dissociated at the oxygen sensor while the base voltage is a voltage at which water molecules are not dissociated at the sensor.

However, the inventors herein have recognized potential issues with operating the exhaust gas sensor in the VVs mode. As one example, air-fuel estimates with the exhaust gas sensor may be invalid when the reference voltage is increased above the base voltage since the oxygen sensor is no longer stoichiometric. For example, at higher reference voltages, the sensor dissociates water vapor and carbon dioxide which contribute to the oxygen concentration represented in the pumping current output by the exhaust gas sensor. Since water vapor and carbon dioxide change with ambient humidity and ethanol concentration in the fuel, and these parameters are unknown, traditional pumping current to air-fuel ratio transfer functions are not accurate at elevated reference voltages. As a result, the vehicle may have to operate in open loop fuel control which may negatively impact emissions, fuel economy, and drivability.

In one example, the issues described above may be at least partially addressed by a method for an engine comprising: responsive to a first condition comprising a reference voltage of a first exhaust oxygen sensor operating in variable voltage mode increasing above a threshold voltage, determining a change in an output of the first exhaust oxygen sensor corresponding to the increase in the reference voltage, correcting the output of the first oxygen sensor based on the output change, and adjusting engine operation based on the corrected output.

In another example, a method may comprise, during operation of a combustion engine in a closed loop control mode based on air-fuel ratio, correcting an output of a first exhaust oxygen sensor operating in a variable voltage mode, and determining the air-fuel ratio based on the corrected output of the first exhaust oxygen sensor.

In this way, the technical effect of preserving the accuracy of air-fuel estimates based on the exhaust gas sensor, and maintaining closed loop fuel control of the engine even when the exhaust oxygen sensor is operating VVS mode can be achieved, thereby reducing engine emissions, increasing fuel economy, and increasing vehicle drivability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
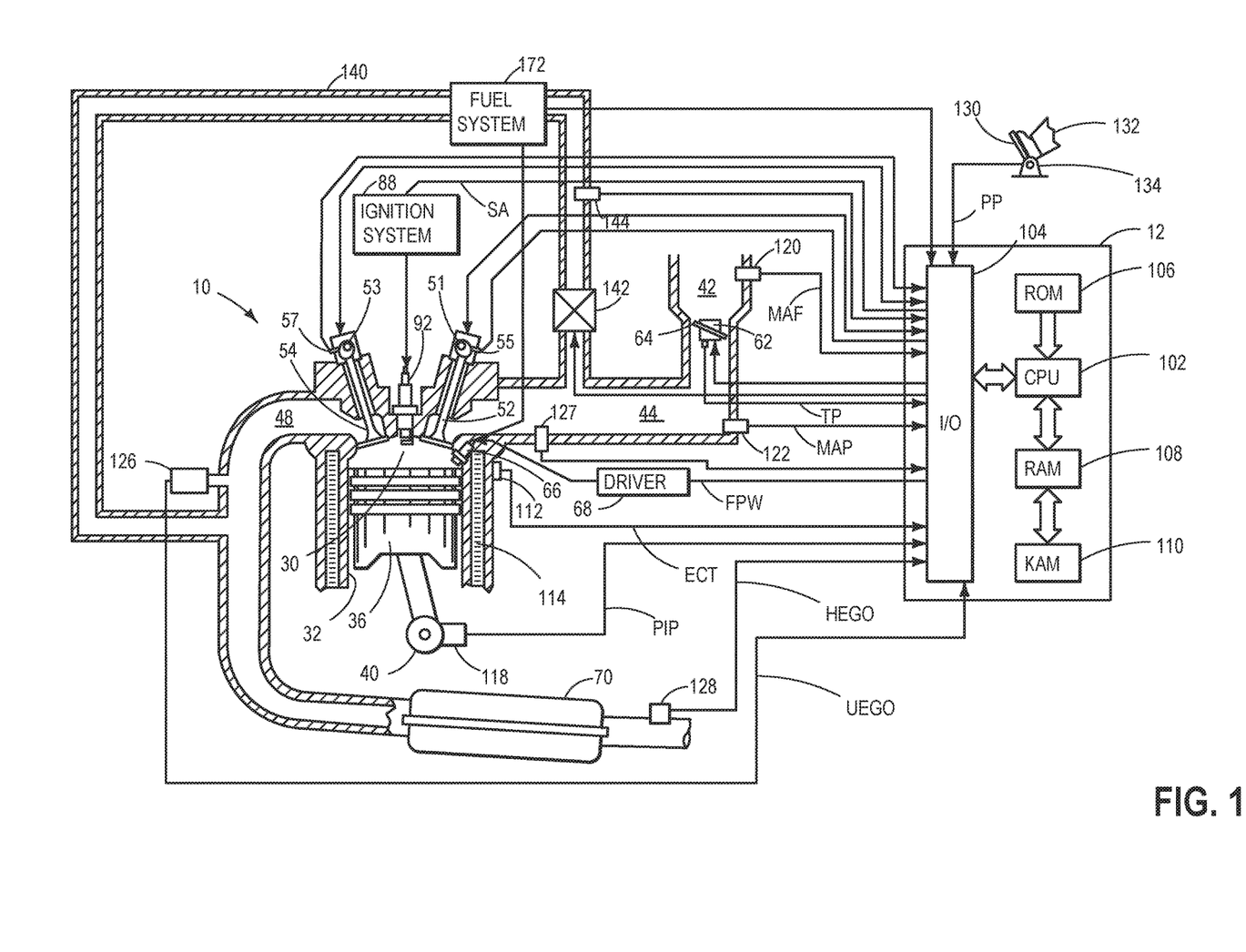
FIG. 1 shows a schematic diagram of an engine including one or more exhaust gas oxygen sensors.
Figure 2:
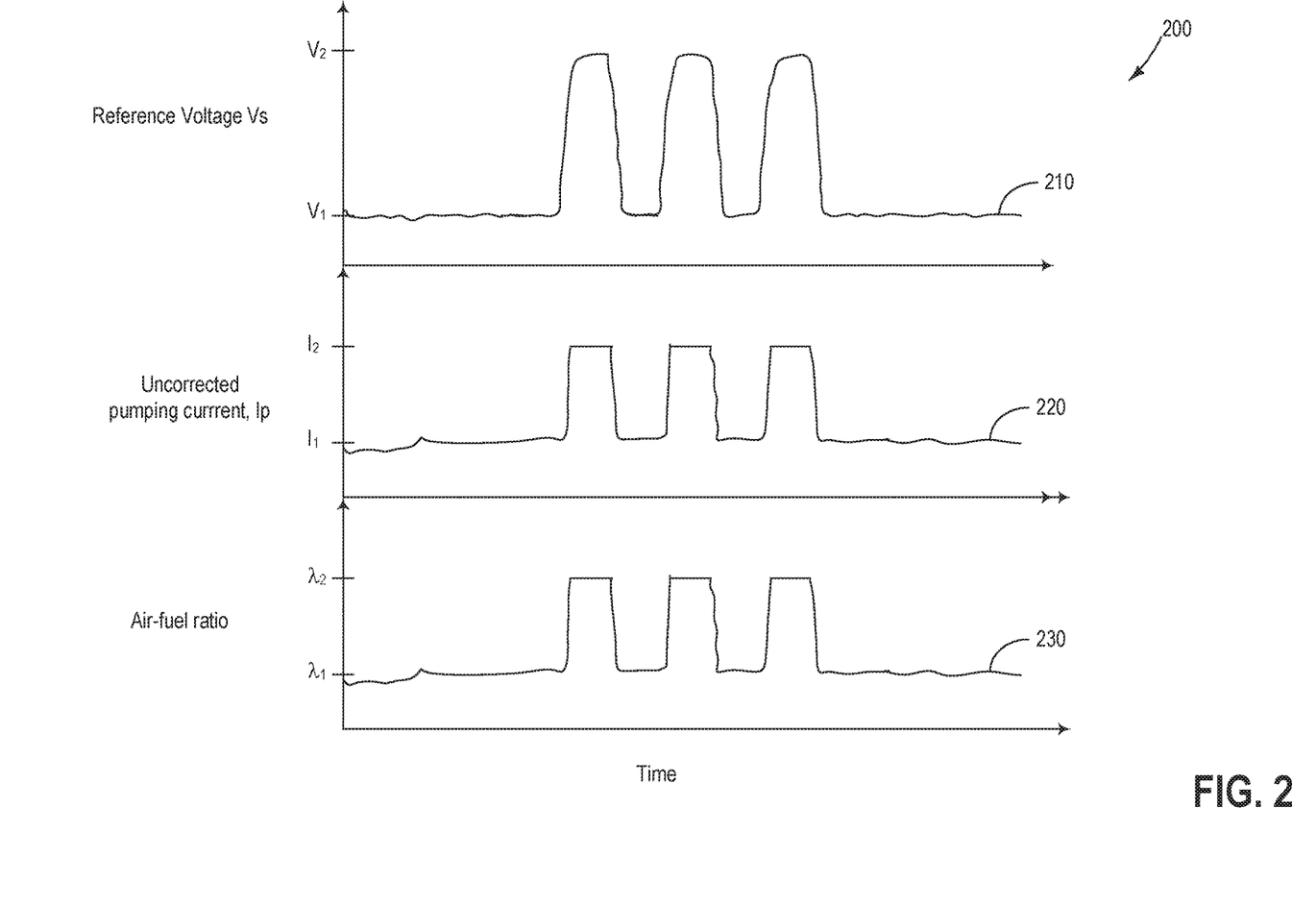
FIG. 2 shows a graph depicting how estimates of the air-fuel ratio may be affected by changes in the reference voltage of an exhaust oxygen sensor.

The following description relates to systems and methods for estimating an air-fuel ratio in exhaust gas. As shown in FIG. 1, an engine may include one or more exhaust oxygen sensors located in an exhaust passage of the engine. One of the oxygen sensors may include a variable voltage oxygen sensor and as such a reference voltage of the oxygen sensor may be adjusted between a lower voltage state where water vapor and carbon dioxide are not dissociated, and a higher voltage state where water and/or carbon dioxide are dissociated. Outputs of the oxygen sensor may be in the form of pumping currents which may be used to determine an air-fuel ratio of the exhaust gas. Specifically, changes in the pumping current from a reference point taken when the oxygen sensor was operating during non-fueling conditions such as during a deceleration fuel shut-off (DFSO) event may be used to infer an air-fuel ratio. However, as seen in FIG. 2 when operating at the higher voltage state, outputs of the oxygen sensor may be corrupted, and as such the accuracy of the air-fuel ratio estimates based thereon may be reduced. The exhaust oxygen sensors may include one or both of UEGO and HEGO sensors, having the respective characteristic outputs as shown in FIG. 3. FIG. 4 shows a method for increasing the accuracy of air-fuel ratio estimates during operation of the oxygen sensor at the higher second reference voltage. As such, errors in the air-fuel estimation when the oxygen sensor is operating in a variable voltage mode may be reduced, as seen in FIG. 7.

Referring now to FIG. 1, a schematic diagram showing one cylinder of a multi-cylinder engine 10, which may be included in a propulsion system of an automobile, is illustrated. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (e.g., cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and exhaust passage 48 can selectively communicate with the combustion chamber 30 via respective intake valve 52 and exhaust valve 54. In some embodiments, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by a controller 12 to vary valve operation. The position of the intake valve 52 and exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. The fuel injector 66 is shown coupled directly to the cylinder 30 for injecting fuel directly therein in proportion to the pulse width of signal FPW received from the controller 12 via an electronic driver 68. In this manner, the fuel injector 66 provides what is known as direct injection (hereafter also referred to as "DI") of fuel into the combustion cylinder 30.

It will be appreciated that in an alternate embodiment, the injector 66 may be a port injector providing fuel into the intake port upstream of the cylinder 30. It will also be appreciated that the cylinder 30 may receive fuel from a plurality of injectors, such as a plurality of port injectors, a plurality of direct injectors, or a combination thereof.

A fuel tank in a fuel system 172 may hold fuels with different fuel qualities, such as different fuel compositions. These differences may include different alcohol content, different octane, different heats of vaporization, different fuel blends, and/or combinations thereof etc. The engine may use an alcohol containing fuel blend such as E85 (which is approximately 85% ethanol and 15% gasoline) or M85 (which is approximately 85% methanol and 15% gasoline). Alternatively, the engine may operate with other ratios of gasoline and ethanol stored in the tank, including 100% gasoline and 100% ethanol, and variable ratios therebetween, depending on the alcohol content of fuel supplied by the operator to the tank. Moreover, fuel characteristics of the fuel tank may vary frequently. In one example, a driver may refill the fuel tank with E85 one day, and E10 the next, and E50 the next. As such, based on the level and composition of the fuel remaining in the tank at the time of refilling, the fuel tank composition may change dynamically.

The day to day variations in tank refilling can thus result in frequently varying fuel composition of the fuel in the fuel system 172, thereby affecting the fuel composition and/or fuel quality delivered by the injector 66. The different fuel compositions injected by the injector 66 may herein be referred to as a fuel type. In one example, the different fuel compositions may be qualitatively described by their research octane number (RON) rating, alcohol percentage, ethanol percentage, etc.

It will be appreciated that while in one embodiment, the engine may be operated by injecting the variable fuel blend via a direct injector, in alternate embodiments, the engine may be operated by using two injectors and varying a relative amount of injection from each injector. It will be further appreciated that when operating the engine with a boost from a boosting device such as a turbocharger or supercharger (not shown), the boosting limit may be increased as an alcohol content of the variable fuel blend is increased.

Continuing with FIG. 1, the intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The intake passage 42 may include a mass air flow sensor 120 and a manifold air pressure sensor 122 for providing respective signals MAF and MAP to controller 12.

An ignition system 88 can provide an ignition spark to the combustion chamber 30 via a spark plug 92 in response to a spark advance signal SA from the controller 12, under select operating modes. Though spark ignition components are shown, in some embodiments, the combustion chamber 30 or one or more other combustion chambers of the engine 10 may be operated in a compression ignition mode, with or without an ignition spark.

A UEGO (universal or wide-range exhaust gas oxygen) oxygen sensor 126 is shown coupled to the exhaust passage 48 upstream of an emission control device 70. The oxygen sensor 126 may also be a variable voltage (VVs) oxygen sensor. A reference voltage of the VVs oxygen sensor may be adjustable between a lower base voltage (e.g., lower voltage state) where water is not dissociated and a higher target voltage (e.g., higher voltage state) where water is dissociated. The outputs of the oxygen sensor at the two reference voltages may then be used to determine water content of the exhaust air of the engine. Additionally, as will be explained in greater detail below, the oxygen sensor 126 may be used to provide an indication of the exhaust gas air-fuel ratio during both operation at the lower voltage state and also at the higher voltage state. A second exhaust oxygen sensor 128 may be coupled to the exhaust passage 48 and positioned downstream of the first exhaust oxygen sensor 126. As shown in FIG. 1, the second exhaust oxygen sensor 128 may be positioned downstream of the emission control device 70, however in other examples, the second exhaust oxygen sensor 128 may be positioned upstream of the emission control device. The second exhaust oxygen sensor 128 may include a VVs oxygen sensor, but it may also be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOR, HC, or CO sensor. Both the first and second exhaust oxygen sensors may transmit their outputs to controller 12. The emission control device 70 is shown arranged along the exhaust passage 48 downstream of the VVs oxygen sensor 126. The device 70 may be a three way catalyst (TWC), NOR trap, various other emission control devices, or combinations thereof. In some embodiments, during operation of engine 10, emission control device 70 may be periodically reset by operating at least one cylinder of the engine within a particular air-fuel ratio.

As shown in the example of FIG. 1, the system further includes an intake air sensor 127 coupled to the intake passage 44. The intake air sensor 127 may be a VVs oxygen sensor, but it may also be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOR, HC, or CO sensor.

Further, in the disclosed embodiments, an exhaust gas recirculation (EGR) system may route a desired portion of exhaust gas from the exhaust passage 48 to the intake passage 44 via an EGR passage 140. The amount of EGR provided to the intake passage 44 may be varied by the controller 12 via an EGR valve 142. Further, an EGR sensor 144 may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; and absolute manifold pressure signal, MAP, from the sensor 122. Engine speed signal, RPM, may be generated by the controller 12 from signal PIP.

The storage medium read-only memory 106 can be programmed with computer readable data representing instructions executable by the processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Turning to FIG. 2, a graph 200 depicts how the exhaust air-fuel ratio estimated with an exhaust oxygen sensor (e.g., oxygen sensor 126) may be corrupted by changes in a reference of voltage of the exhaust oxygen sensor. Plot 210 shows changes in the reference voltage applied to the oxygen sensor, plot 220 shows changes in a pumping current output of the oxygen sensor, and plot 230 shows the air-fuel estimated based on an output of the oxygen sensor such as pumping current, as explained above. As described with reference to FIG. 1, outputs from a variable voltage (VVs) exhaust gas oxygen sensor (e.g., oxygen sensor 126) may be used to estimate an air-fuel ratio in the exhaust gas. Specifically, the outputs of the oxygen sensor may be in the form of a pumping current (Ip) generated by an applied reference voltage (plot 220). The pumping current may change in response to changes in the amount of fuel injected to the engine cylinders (e.g., cylinder 30) and thus may be used as an indication of the air-fuel ratio. The air-fuel ratio may be estimated based on a change in the pumping current from a baseline value when fuel is not being supplied to the engine cylinders. The baseline value may be estimated during non-fueling conditions such as during a deceleration fuel shut-off (DFSO) event. Additionally, the oxygen sensor may be used to estimate an amount of water in the exhaust gas which may be used to estimate various engine operating parameters such as ambient humidity, fuel ethanol content and, if the engine is a dual-fuel engine, a secondary fluid injection amount. To give an estimate of the water content, the reference voltage oxygen sensor may be adjusted between a lower base voltage state, $V_1$ as depicted in plot 210, where water is not dissociated (e.g., approximately 450 mV) and a higher target voltage state $V_2$, which is above a threshold voltage where water is dissociated (e.g., approximately 1100 mV). The water content may be estimated by comparing the difference in pumping current output (plot 220) at the two different reference voltages. Thus, as seen in plot 210, the reference voltage may be modulated between $V_1$ and $V_2$ to measure the exhaust gas water content.

However, during operation of the oxygen sensor at the higher target voltage state, the estimate of the air-fuel ratio may be corrupted. Specifically, at the higher reference voltage state $V_2$, the oxygen sensor dissociates water vapor and carbon dioxide, which may contribute to the oxygen concentration represented in the Ip signal. Thus, as a result of increases in the reference voltage above a threshold voltage, the Ip signal may increase due to increases in the oxygen concentration as a result of water vapor and carbon dioxide dissociating. As a result, the air-fuel ratio may be overestimated. As can be seen at plot 230, when the reference voltage is increased from $V_1$ to $V_2$ the estimate of the air-fuel ratio increases from a lower first level $L_1$ to a higher second value $L_2$, even though the actual air-fuel ratio may remain at relatively the same first level $L_1$. Air-fuel ratio estimates may therefore have reduced accuracy when the oxygen sensor is operating at a reference voltage high enough to dissociate water and/or carbon dioxide. Thus, traditional methods of estimating the air-fuel ratio using a variable voltage exhaust gas sensor may be limited to estimating the air-fuel ratio only when the oxygen sensor is operating at its lower base voltage or a voltage low enough such that water vapor and carbon dioxide are not dissociated. As further described below, by correcting an output signal (e.g., Ip) from a first exhaust oxygen sensor when the oxygen sensor is operating in variable voltage mode, a reliable and accurate estimate of the air-fuel ratio can be maintained even when the oxygen sensor is operating in variable voltage mode at a higher voltage state. In other words, to increase the accuracy of the air-fuel estimations when the oxygen sensor is operating at a high enough reference voltage to dissociate water vapor and carbon dioxide, a method of correcting the oxygen sensor output may be used to compensate for the additional oxygen contributed by the dissociated water vapor and carbon dioxide.

The pumping current output by the exhaust oxygen sensor may be affected by changes in the amount of fuel injected to the engine cylinders, and changes in the reference voltage applied to the oxygen sensor that cause dissociation of water and/or carbon dioxide to produce additional oxygen. Specifically, increases in the reference voltage may cause increases in the pumping current. Increases in the fuel injection amount, however, may cause decreases in the pumping current, due to the increased amount of fuel relative to oxygen in the engine exhaust. When operating at a voltage high enough to dissociate water vapor and carbon dioxide, the pumping current output by the oxygen sensor may increase in response to increases in the oxygen concentration of the exhaust. However, the actual air-fuel ratio in the exhaust gas arising from fuel combustion in the engine may be affected solely by the amount of fuel injected to the engine cylinders. Therefore, estimates of the air-fuel ratio based on the pumping current output by the oxygen sensor may be corrupted when the reference voltage of the oxygen sensor changes. Thus, to account for changes in the pumping current that do not correspond to actual changes in the air-fuel ratio, the controller, as described below, can implement methods to correct the pumping current to increase the accuracy of estimates of the air-fuel ratio. For example, to account for changes in the pumping current due to changes in the reference voltage, the controller may subtract a change in the pumping current corresponding to the change in the reference voltage of the oxygen sensor. Furthermore, the controller may estimate an air-fuel ratio from a second exhaust oxygen sensor measurement and may correct the pumping current of the first exhaust oxygen sensor and/or estimate of the air-fuel ratio based thereon based on the air-fuel ratio estimate from the second exhaust oxygen sensor measurement. In this way, if the pumping current changes due to an increase in the reference voltage of the first exhaust oxygen sensor to a voltage high enough to dissociate water vapor and/or carbon dioxide, the controller may maintain an accurate estimate of the exhaust air-fuel ratio.

Figure 3A:
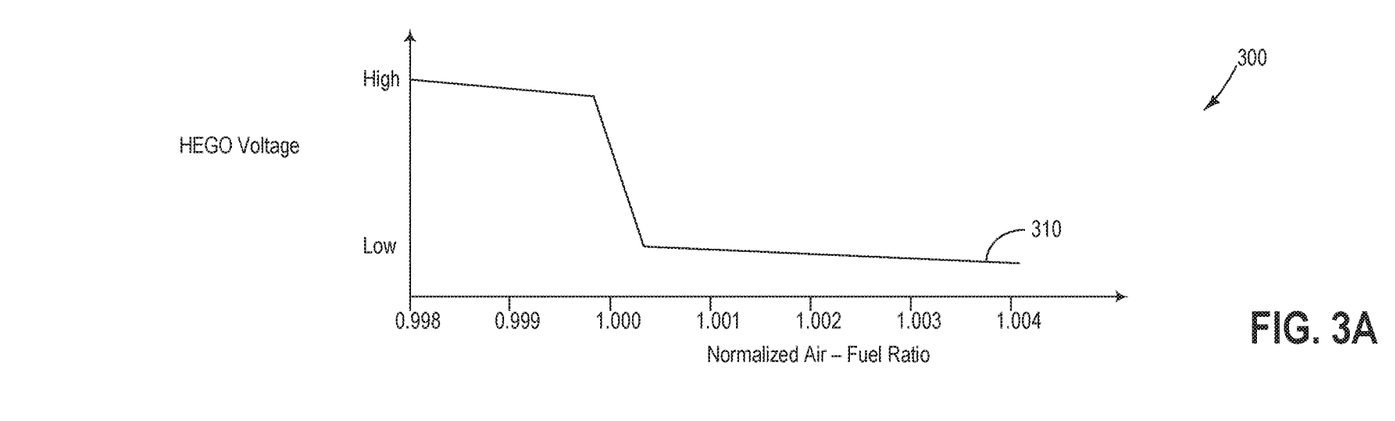
FIGS. 3A and 3B show graphs depicting example outputs of an HEGO and UEGO exhaust oxygen sensor, respectively.
Figure 3B:
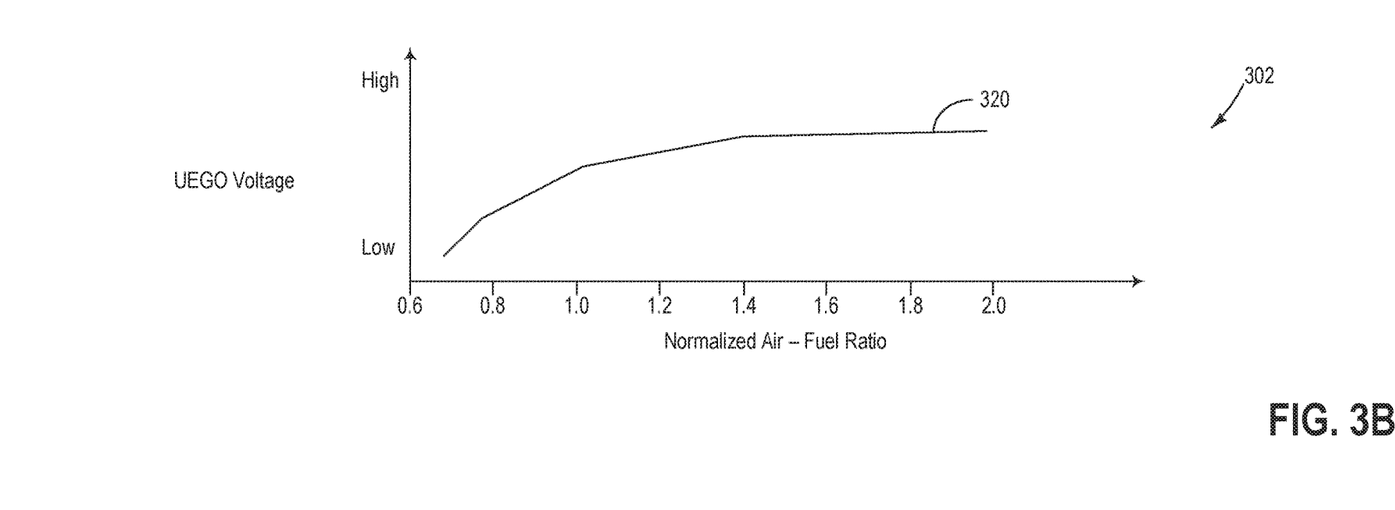
Figure 4:
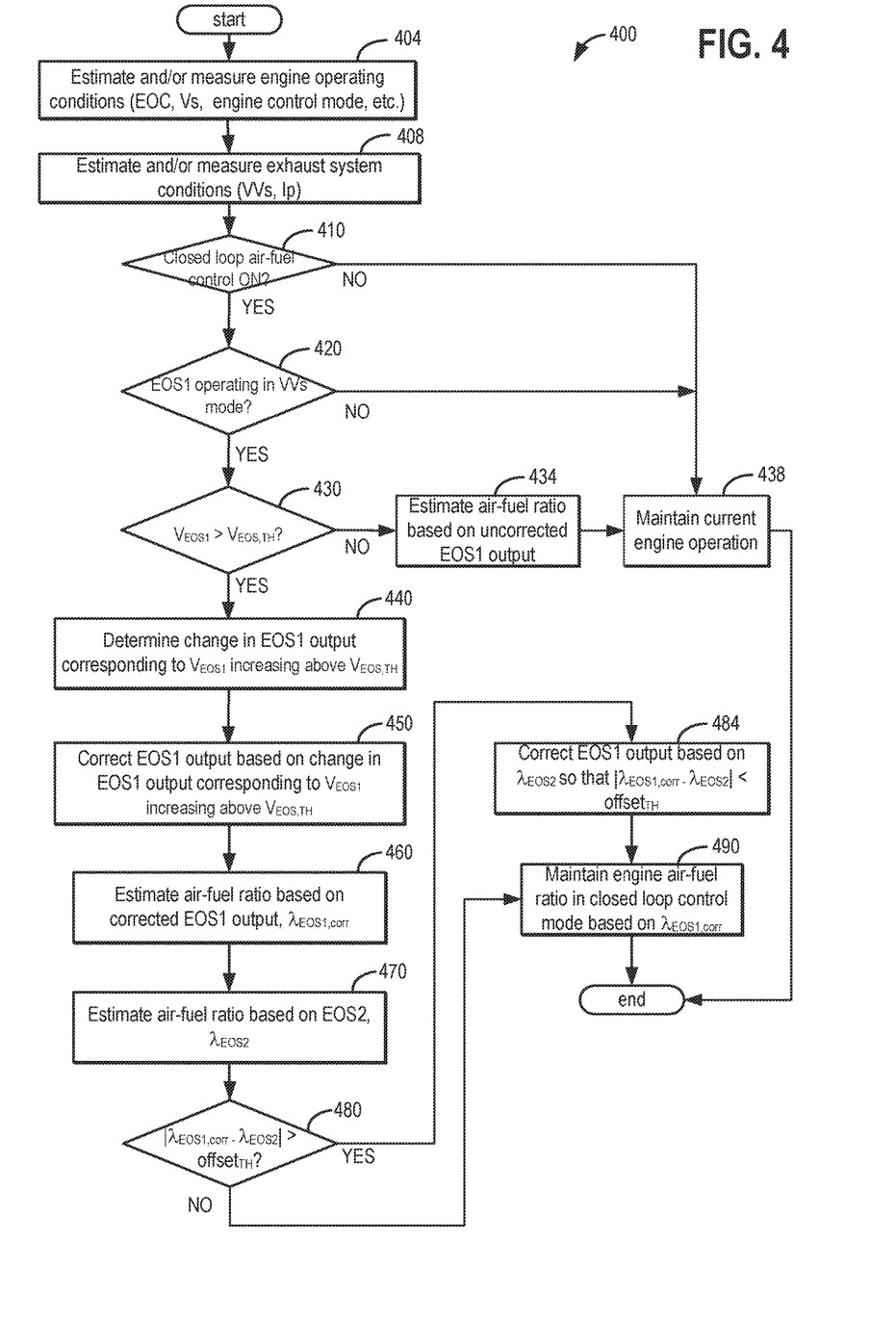
FIG. 4 shows a flow chart of a method for estimating an exhaust air-fuel ratio during variable voltage operation of an exhaust oxygen sensor.

Referring now to FIGS. 3A and 3B, a description is given for two common types of exhaust gas oxygen sensors; a switching (HEGO) sensor and a wide range (UEGO) sensor. The HEGO sensor provides a high gain and operates close to stoichiometry but provides air-fuel information over a limited range. The UEGO sensor operates across a wide range of air fuel ratios; typically from 10:1 to air, but as a result has a lower gain. Additionally, the UEGO sensor does not provide as precise an indication of stoichiometry as the HEGO sensor. Dual cell UEGO sensors measure the air fuel ratio by measuring the oxygen pumping current required to maintain a stoichiometric air fuel ratio in a cavity inside the sensor as measured by an internal HEGO like reference circuit. Plot 300 in FIG. 3A shows an example HEGO sensor output voltage 310 response, and plot 302 of FIG. 3B shows an example UEGO sensor output voltage 320 response with respect to normalized air-fuel ratio.

There may be advantages and disadvantages when comparing HEGO and UEGO sensors. For example, when a sensor is used in a post catalyst position, the precise indication of stoichiometry given by the HEGO sensor is useful, but the limited bandwidth limits the capability of the control system. Further, the limited range of accurate information also limits use away from stoichiometric operation (such as during feedback lean air-fuel ratio, or rich air-fuel ratio, control). As described above, first exhaust oxygen sensor 126 may include a UEGO type sensor, while second exhaust oxygen sensor 128 may include either a UEGO or HEGO or other type oxygen sensor.

Moving on to FIG. 4, it illustrates an example method 400 for correcting air-fuel ratio estimates when an exhaust oxygen sensor is operating at a high voltage state in VVs mode. Method 400 may be executed by a controller on board a vehicle propelled by a combustion engine such as a hybrid-electric vehicle.

Method 400 begins at 404 by estimating and/or measuring engine operating conditions. Engine operating conditions may be based on feedback from a plurality of sensors and may include: engine temperature, engine speed and load, intake mass air flow, manifold pressure, etc.

Subsequently at 408, the controller may estimate and/or measure exhaust system conditions such as a reference voltage or pumping current of the first exhaust oxygen sensor. Based on feedback from a first exhaust oxygen sensor (e.g. oxygen sensor 126), the controller may measure a first pumping current (Ip) generated by a lower reference voltage applied to the oxygen sensor. The lower reference voltage may be a reference voltage low enough such that water vapor and carbon dioxide are not dissociated (e.g., 450 mV). As explained earlier with reference to FIG. 2, the first pumping current of the oxygen sensor at the lower reference voltage may be relatively unaffected by changes in ambient humidity or ethanol concentration of the fuel because water vapor and carbon dioxide are not dissociated. Thus, the first pumping current may be directly related to an air-fuel ratio. As such, the engine may be operating in a closed loop air-fuel control mode in which the controller may estimate the air-fuel ratio based on the pumping current measured at 404. As explained above with reference to FIG. 2, the controller may estimate the air-fuel ratio based on a change in the pumping current from a reference point when fuel was not being injected to the engine such as during a deceleration fuel shut-off (DFSO) event. At 410, the controller may determine if the closed loop air-fuel control is ON. As an example of closed loop air-fuel control mode operation, the controller may adjust the amount of fuel injected to the engine cylinders (e.g., cylinder 30) if the estimated air-fuel ratio is different from a desired air-fuel ratio, where the desired air-fuel ratio may be based on the engine operating parameters including: engine load, engine speed, engine temperature, etc. The estimated air-fuel ratio may be determined based on the one or more outputs of the first exhaust oxygen sensor. For example, the air-fuel ratio may be estimated based on a pumping current (Ip) of the first exhaust oxygen sensor. In another example, any pumping current derivative signal may be used to estimate the air-fuel ratio, including exhaust oxygen concentration. If the closed loop air-fuel control is ON, method 400 may continue at 420.

At 420, the controller may determine if the first exhaust oxygen sensor (EOS1) is operating in a variable voltage (VVs) mode. Specifically, EOS1 may include a UEGO sensor and may be operated in a VVs mode to estimate one or more exhaust gas properties such as water content, humidity, or alcohol content. Changes in the pumping current output of the oxygen sensor due to modulation of the reference voltage between a first lower reference voltage state and a higher second voltage state may be used to estimate water content and other properties of the exhaust gas. As an example, if the engine is a dual-fuel engine, the controller may determine that it is desired to estimate the water content of the exhaust gas so that the amount of secondary fuel injected to the engine may be adjusted.

If the EOS1 is operating in VVs mode, then method 400 continues at 430 where the controller determines if the reference voltage, $V_{EOS1}$, is greater than a threshold reference voltage, $V_{EOS,TH}$. As described above with reference to FIG. 2, $V_{EOS,TH}$ may correspond to a voltage above which water and/or carbon dioxide in the exhaust stream may dissociate to form oxygen. Thus, if $V_{EOS1} > V_{EOS,TH}$, then the output of the EOS1 may include a response to the dissociated oxygen and may be corrected prior to generating an estimate of the air-fuel ratio based thereon, as described further below. In other examples, the controller may determine if another EOS1 output such as pumping current, may be greater than a threshold level. For example, at 430, the controller may determine if Ip is greater than a threshold pumping current, $Ip_{TH}$. $Ip_{TH}$ may correspond to a pumping current above which water and carbon dioxide are dissociated in the exhaust stream.

If $V_{EOS1}$ is not greater than $V_{EOS,TH}$, then method 400 continues to 434 and the controller may estimate the air-fuel ratio based on outputs from the oxygen sensor operating at the lower first reference voltage, using an uncorrected EOS1 output (e.g., pumping current). In other words, when the reference voltage of the first exhaust oxygen sensor may be maintained at the lower first reference voltage where water vapor and carbon dioxide are not dissociated, the EOS1 output may be used directly, without correction for estimating the air-fuel ratio. At 438, method 400 maintains the current engine exhaust system operation. For example, after estimating air-fuel ratio at 434, method 400 maintains closed loop air-fuel control ON and maintains operating EOS1 in VVs mode. If closed loop air-fuel control is OFF at 410, then the controller maintains the closed loop air-fuel control OFF at 438. As examples, closed loop air-fuel control may be off when the engine is OFF, for example, while the electric motor only is used for propelling a hybrid vehicle, while the vehicle is parked, and the like. If the controller determines that EOS1 is not operating in VVs mode at 420, the controller may maintain operation of EOS1 in VVs mode and maintain closed loop air-fuel control ON at 438.

Returning to method 400 at 430, if the controller determines that $V_{EOS1} > V_{EOS,TH}$, the controller proceeds to 440 where the controller may determine a change in one or more EOS1 outputs corresponding to $V_{EOS1}$ increasing above $V_{EOS,TH}$. For example, the pumping current, Ip, of EOS1 may increase in response to and corresponding to $V_{EOS1}$ increasing above $V_{EOS,TH}$. Thus, at 440, the change in one or more EOS1 outputs, such as Ip, may be determined and stored in memory by the controller. At 450, the controller may correct the EOS1 output based on the change in EOS1 output corresponding to $V_{EOS1}$ increasing above $V_{EOS,TH}$. For example, the controller may subtract the change in Ip corresponding to $V_{EOS1}$ increasing above $V_{EOS,TH}$ from the Ip output signal, thereby correcting Ip. As a result the corrected Ip signal may include the pumping current output due to oxygen in the exhaust stream, excluding the contribution of oxygen generated from dissociation of carbon dioxide and water. In this way, at 460, the controller may estimate a corrected exhaust stream air-fuel ratio, $\lambda_{EOS1,corr}$ based on the corrected EOS1 output. $\lambda_{EOS1,corr}$ is thus estimated based on the EOS1 output signal due to oxygen in the exhaust stream, excluding the contribution of oxygen generated from dissociation of carbon dioxide and water.

At 470, the controller may further estimate an air-fuel ratio of the exhaust stream based on a second exhaust oxygen sensor (EOS2), $\lambda_{EOS2}$. As described above EOS2 may be an oxygen sensor positioned in the exhaust stream downstream from EOS1. EOS2 may include an HEGO, UEGO, or another type of oxygen sensor. In one example EOS2 may include an HEGO sensor positioned downstream from an emission control device 70 of an exhaust passage.

At 480, the controller may calculate a difference between the estimated air-fuel ratio based on EOS2 and the estimated air-fuel ratio based on EOS1, $|\lambda_{EOS1,corr} - \lambda_{EOS2}|$ is greater than a threshold offset, $offset_{TH}$. If $|\lambda_{EOS1,corr} - \lambda_{EOS2}| > offset_{TH}$, it may indicate that the corrected estimated air-fuel ratio based on EOS1, $\lambda_{EOS1,corr}$, may need further correction. If $|\lambda_{EOS1,corr} - \lambda_{EOS2}| > offset_{TH}$, method 400 continues at 484, where the controller may correct $\lambda_{EOS1,corr}$ based on $\lambda_{EOS2}$ so that $|\lambda_{EOS1,corr} - \lambda_{EOS2}| < offset_{TH}$. As an example, the $offset_{TH}$ may be set to 0, and $\lambda_{EOS1,corr}$ may be corrected by setting $\lambda_{EOS1,corr} = \lambda_{EOS2}$. In another example, $offset_{TH}$ may be set to be equivalent to a measurement uncertainty of $\lambda_{EOS2}$ such that if $|\lambda_{EOS1,corr} - \lambda_{EOS2}|$ is less than this measurement uncertainty, $\lambda_{EOS1,corr}$ may not be further corrected based on $\lambda_{EOS2}$. $|\lambda_{EOS1,corr} - \lambda_{EOS2}|$ being greater than $offset_{TH}$ may arise following cumulative corrections of $\lambda_{EOS1}$. For example, when $V_{EOS1}$ increases above $V_{EOS,TH}$ at 430, there may be a small error associated with estimating the change in EOS1 output corresponding to $V_{EOS1}$ increasing above $V_{EOS,TH}$ due to measurement sensitivity limitations of $V_{EOS1}$ and Ip, time delays between $V_{EOS1}$ increasing above $V_{EOS,TH}$ and measurement of the corresponding Ip (or other EOS1 output signal) change, and the like. Thus, with each succeeding event where $V_{EOS1}$ increases above $V_{EOS,TH}$ and $\lambda_{EOS1}$ is corrected in steps 440-460, an offset between $\lambda_{EOS1,corr}$ and $\lambda_{EOS2}$ may accumulate. By checking for this offset at 480, and correcting $\lambda_{EOS1}$ for this offset based on $\lambda_{EOS2}$, the accuracy in the estimated air-fuel ratio of the exhaust stream may be preserved. At 490, the controller maintains the air-fuel control in closed loop control mode based on $\lambda_{EOS1,corr}$. Thus, by correcting for changes in EOS1 output due to operation of EOS1 in VVs mode, and by further correcting for offsets between $\lambda_{EOS1,corr}$ and $\lambda_{EOS2}$, the controller, via method 400, may maintain closed loop control of the air-fuel ratio, including while EOS1 may be operating in VVs mode.

In this manner, a method for an engine may comprise, responsive to a first condition comprising a reference voltage of a first exhaust oxygen sensor operating in variable voltage mode increasing above a threshold voltage, determining a change in an output of the first exhaust oxygen sensor corresponding to the increase in the reference voltage, correcting the output of the first exhaust oxygen sensor based on the output change, and adjusting engine operation based on the corrected output. Additionally or alternatively, adjusting engine operation may be based on the corrected output comprises determining an air-fuel ratio based on the corrected output and adjusting engine operation based on the air-fuel ratio. Additionally or alternatively, the method may further comprise, responsive to the increase in the reference voltage, correcting the output of the first exhaust oxygen sensor based on the output of a second exhaust oxygen sensor. Additionally or alternatively, the first condition may further comprise a pumping current of the first exhaust oxygen sensor increasing above a threshold current. Additionally or alternatively, the method may further comprise during operation of the first exhaust oxygen sensor in variable voltage mode, controlling the engine in a closed loop manner based on the air-fuel ratio, and responsive to the increase in the reference voltage, maintaining closed loop control of the engine based on the air-fuel ratio. Additionally or alternatively, the threshold voltage may comprise a voltage above which exhaust water or exhaust carbon dioxide are dissociated at the first oxygen sensor. Additionally or alternatively, the second exhaust oxygen sensor may be positioned downstream from the first exhaust oxygen sensor. Additionally or alternatively, the first exhaust oxygen sensor may be positioned upstream from an emissions control device. Additionally or alternatively, correcting the output of the first oxygen sensor may be based on the output change comprises subtracting the change in the output from the output.

In another example, a method may comprise: during operation of a combustion engine in a closed loop control mode based on an air-fuel ratio, correcting an output of a first exhaust oxygen sensor operating in a variable voltage mode, and determining the air-fuel ratio based on the corrected output of the first exhaust oxygen sensor. Additionally or alternatively, the method may further comprise correcting the output of the first exhaust oxygen sensor while the first exhaust oxygen sensor is operating in a higher voltage state. Additionally or alternatively, correcting the output of the first exhaust oxygen sensor may comprise determining a change in the output corresponding to an increase in a reference voltage of the first exhaust oxygen sensor from a lower voltage state to the higher voltage state, and subtracting the output change from the output. Additionally or alternatively, correcting the output of the first exhaust oxygen sensor may further comprise correcting the output based on an output of a second exhaust oxygen sensor. Additionally or alternatively, the first exhaust oxygen sensor may be positioned upstream from the second exhaust oxygen sensor. Additionally or alternatively, the higher voltage state may correspond to a voltage at which exhaust water or exhaust carbon dioxide dissociate to oxygen.

Figure 5:
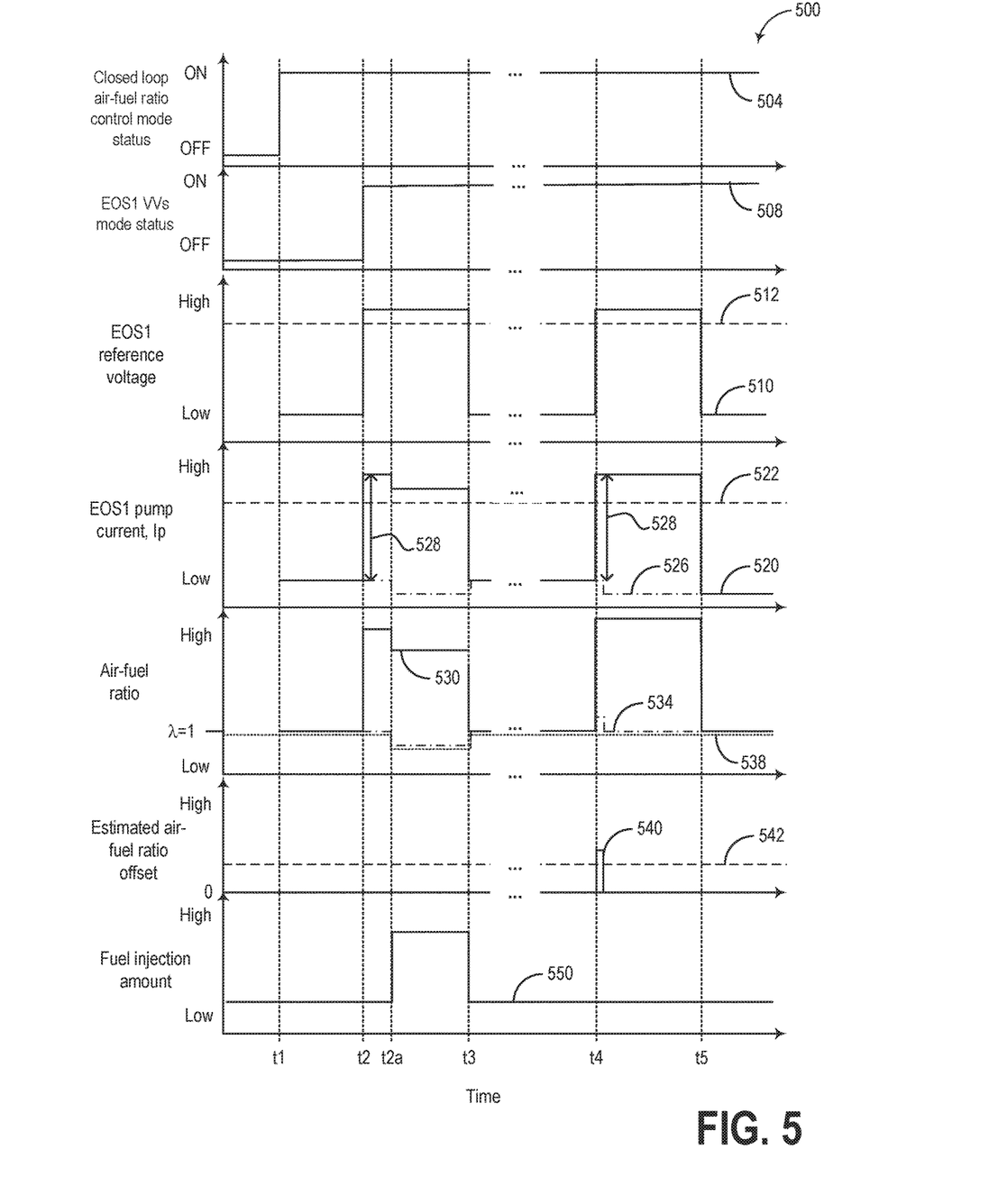
FIG. 5 shows a timeline depicting changes in air-fuel estimates under varying engine operating conditions using one or more exhaust oxygen sensors.

Turning now to FIG. 5, it illustrates a timeline 500 depicting changes in air-fuel estimates under varying engine operating conditions using one or more exhaust oxygen sensors. Timeline 500 includes trend lines for closed loop air-fuel ratio control mode status 504, EOS1 VVs mode status 508, $V_{EOS1}$ 510, EOS1 uncorrected pump current, Ip 520, corrected EOS $Ip_{corr}$ 526, uncorrected air-fuel ratio based on EOS1, $\lambda_{EOS1}$ 530, corrected air-fuel ratio $\lambda_{EOS1,corr}$ 534, air-fuel ratio based on EOS2, $\lambda_{EOS2}$ 538, estimated air-fuel ratio offset ($|\lambda_{EOS1,corr}-\lambda_{EOS2}|$) 540, and fuel injection amount 550 injected into the engine cylinders. Also shown are $V_{EOS,TH}$ 512, threshold pumping current, $Ip_{TH}$ 522, a changes in Ip 528 (corresponding to increases in $V_{EOS1}$ above $V_{EOS,TH}$, and offset$_{TH}$ 542. As an example EOS1 may be a UEGO capable of operating in VVs mode and positioned upstream from an emissions control device. In the example of timeline 500, EOS2 may comprise an HEGO operating at stoichiometry ($\lambda$=1). In timeline 500, $\lambda_{EOS2}$ 538 is shown slightly offset below $\lambda$=1, for illustrative purposes. In other example vehicle systems, EOS2 may include a UEGO or HEGO, or other type of oxygen sensor positioned downstream from EOS1. The EOS1 uncorrected pump current Ip 520 and the uncorrected air-fuel ratio based on EOS1 $\lambda_{EOS1}$ are shown in timeline 500 for illustrative purposes. By comparing Ip versus $Ip_{corr}$ and $\lambda_{EOS1}$ versus $\lambda_{EOS1,corr}$ the advantages of correcting the EOS1 pumping current responsive to $V_{EOS1}$ increasing above $V_{EOS,TH}$ during operation of EOS1 in variable voltage mode can be made more apparent. Specifically, the accuracy of air-fuel estimates based on the exhaust gas sensor can be preserved, and closed loop fuel control of the engine can be maintained even when the exhaust oxygen sensor is operating VVS mode, thereby reducing engine emissions, increasing fuel economy, and increasing vehicle drivability.

Prior to time t1, air-fuel ratio closed loop control mode is off, indicating that the vehicle may be operating in electric mode, the vehicle may be parked, and the like. At time t1, closed-loop air-fuel ratio control mode is switched ON and the controller begins monitoring $V_{EOS1}$ and one or more output signals from EOS1, including Ip. A fuel injection amount is relatively constant at a lower level prior to time t1 until time t2a. After time t1, the controller also begins estimating $\lambda_{EOS1}$ based on the EOS1 output signal (e.g., Ip). At time t2, the EOS1 VVs mode status is switched ON. EOS1 may be operated in variable voltage mode for various reasons discussed above, including to determine a humidity, water content, or alcohol content of the exhaust stream. At time t2, the closed loop air-fuel ratio control mode status remains on and hence the controller continues to estimate exhaust air-fuel ratio.

$V_{EOS1}$ is shown to increase from a first lower voltage reference state to a second higher voltage reference state above $V_{EOS,TH}$ at time t2, generating a corresponding increase in one or more output signals of EOS1, including the pumping current, Ip 520. $V_{EOS,TH}$ may comprise a voltage above which water and or carbon dioxide in the exhaust are dissociated to form oxygen. As such, the uncorrected air-fuel ratio 530 estimated based on an uncorrected Ip signal 520 changes based on the presence of oxygen generated from dissociation of water and/or carbon dioxide in the exhaust. As such, the controller may compensate for the additional dissociated oxygen in the exhaust by correcting an estimate for air-fuel ratio based on EOS1. At time t2, in response to $V_{EOS1}$>$V_{EOS,TH}$, the controller may determine an increase in Ip 528 corresponding to the increase in $V_{EOS1}$>$V_{EOS,TH}$ at t2. Subsequently, the controller may subtract the increase in Ip 528 corresponding to the increase in $V_{EOS1}$>$V_{EOS,TH}$ at t2 as shown by the corrected output signal for the pumping current Ip 526. As shown by timeline 500 at t2, the corrected pumping current signal 526 retains the Ip value just prior to time t2 when water and/or carbon dioxide in the exhaust are not dissociated. As such the controller may accurately estimate a corrected air-fuel ratio, $\lambda_{EOS1,corr}$ 534 based on the corrected output signal Ip from EOS1. Because $\lambda_{EOS1,corr}$ 534 has been timely corrected for the oxygen produced from dissociation of water and/or carbon dioxide in the exhaust, $\lambda_{EOS1,corr}$ may be used as a control input for closed loop control of the air-fuel ratio during VVs operation of EOS1. Between time t2 and time t3, offset 540 between $\lambda_{EOS1,corr}$ and $\lambda_{EOS2}$ is (e.g., ~0) less than offset$_{TH}$. As such, $\lambda_{EOS1,corr}$ is not further corrected by the controller based on $\lambda_{EOS2}$.

At time t2a, an amount of fuel injected into the engine cylinders 550 increases to a higher level. Because the first exhaust oxygen sensor remains operating in variable voltage mode, the EOS1 reference voltage remains at the same higher voltage state. However, due to the increase in fuel injection amount 550 at time t2a, the uncorrected pumping current 520 output by the oxygen sensor may decrease at time t2a since there is a higher amount of fuel relative to air in the exhaust (e.g., indicating a lower oxygen concentration). As previously described, the pumping current may be directly related to an oxygen concentration of the exhaust gas, and increases in fuel injection amount may result in decreases in the oxygen concentration of the exhaust gas which may be reflected in a decrease in the pumping current. The decrease in the pumping current may be reflected as an equivalent decrease in both the uncorrected pumping current 520 and the corrected pumping current 526. Because the reference voltage $V_{EOS1}$ does not increase from below $V_{EOS,TH}$ to above $V_{EOS,TH}$ at time t2a, no further correction of the pump current signal is made. In response to the decrease in the pumping current 526, the estimated air-fuel ratio based on EOS1 ($\lambda_{EOS1}$, $\lambda_{EOS1,corr}$) and EOS2 ($\lambda_{EOS2}$) also decrease at time t2a to reflect the lower exhaust oxygen concentration due to the increase in fuel injection amount. At time t3, $V_{EOS1}$ decreases from the second higher voltage reference state above $V_{EOS,TH}$ to the first lower reference voltage state below $V_{EOS,TH}$, and the fuel injection amount 550 decreases back to its original level prior to t2a. Consequently, the pumping current Ip (corrected and uncorrected) and estimated air-fuel ratios based on EOS1 and EOS2 return to its original level prior to t2. The discrepancies between the uncorrected pumping current 520 and the corrected pumping current 520, and the uncorrected air-fuel ratio 530 and the corrected air-fuel ratio 534 in timeline 500 illustrate how correcting the pumping current responsive to $V_{EOS1}>V_{EOS,TH}$ may maintain an accurate estimate of air-fuel ratio and can enable preservation of reliable closed loop control of the engine based on air-fuel ratio during variable voltage mode operation of the first exhaust oxygen sensor.

At a later time t4, $V_{EOS1}$ again increases from a first lower reference voltage state below $V_{EOS,TH}$ to a second higher voltage reference state above $V_{EOS,TH}$, generating a corresponding increase in one or more output signals of EOS1, including the pumping current, Ip 520. $V_{EOS,TH}$ may comprise a voltage above which water and or carbon dioxide in the exhaust are dissociated to form oxygen. As such, the uncorrected air-fuel ratio 530 estimated based on an uncorrected Ip signal 520 changes based on the presence of oxygen generated from dissociation of water and/or carbon dioxide in the exhaust. As such, the controller may compensate for the additional dissociated oxygen in the exhaust by correcting an estimate for air-fuel ratio based on EOS1. At time t4, one or more output signals, such as Ip, may increase in response to $V_{EOS1}$ increasing above $V_{EOS,TH}$. Also responsive to $V_{EOS1}$ increasing above $V_{EOS,TH}$, the controller may determine an increase in Ip 528 corresponding to the increase in $V_{EOS1}>V_{EOS,TH}$ at t4. Subsequently, the controller may correct Ip by subtracting the increase in Ip 528 corresponding to the increase in $V_{EOS1}>V_{EOS,TH}$ at t4 as shown by the corrected output signal for the pumping current Ip 526. At time t4, the controller may estimate a corrected air-fuel ratio based on the corrected EOS1 output, $\lambda_{EOS1,corr}$. As shown in timeline 500, the uncorrected air-fuel ratio estimate 530 increases sharply with the increase in $V_{EOS1}$ above $V_{EOS,TH}$ at time t4. In contrast, the corrected air-fuel ratio 534, determined based on the corrected Ip signal 526 is much closer to the air-fuel estimate just prior to t4, before the increase in $V_{EOS1}$ above $V_{EOS,TH}$.

At time t4 (and just after time t4 as shown in timeline 500 for illustrative purposes) the corrected air-fuel ratio 534 remains offset from the air-fuel ratio $\lambda_{EOS2}$ 538 estimated from EOS2. In response to the offset $|\lambda_{EOS1,corr}-\lambda_{EOS2}|$ at time t4 being greater than offset$_{TH}$ 542, the controller may further correct $\lambda_{EOS1,corr}$ based on $\lambda_{EOS2}$ so that the offset is decreased below offset$_{TH}$. In one example, the controller may set $\lambda_{EOS1,corr}=\lambda_{EOS2}$, as shown in timeline 500, just after time t4, when the offset decreases to 0. In this way, the estimated air-fuel ratio $\lambda_{EOS1,corr}$ may be used as an input to the closed loop air-fuel controller and closed loop air-fuel control can be reliably maintained during operation of the first exhaust oxygen sensor in variable voltage mode. At time t5, $V_{EOS1}$ decreases from the second higher reference voltage state greater than $V_{EOS,TH}$ to the first lower reference voltage state less than $V_{EOS,TH}$, and the EOS1 output signal, Ip, decreases. The discrepancies between the uncorrected pumping current 520 and the corrected pumping current 520, and the uncorrected air-fuel ratio 530 and the corrected air-fuel ratio 534 in timeline 500 illustrate how correcting the pumping current responsive to $V_{EOS1}>V_{EOS,TH}$ may maintain an accurate estimate of air-fuel ratio and can enable preservation of reliable closed loop control of the engine based on air-fuel ratio during variable voltage mode operation of the first exhaust oxygen sensor.

In this manner, an engine system may comprise: an engine; a first exhaust oxygen sensor positioned at an exhaust passage of the engine; and a controller, including executable instructions to, during operation of the engine in a closed loop control mode based on an air-fuel ratio, correcting an output of the first exhaust oxygen sensor operating in a variable voltage mode, and determining the air-fuel ratio based on the corrected output of the first exhaust oxygen sensor. Additionally or alternatively, the executable instructions may further comprise correcting the output of the first exhaust oxygen sensor while the first exhaust oxygen sensor is operating in a higher voltage state. Additionally or alternatively, correcting the output of the first exhaust oxygen sensor may comprise determining a change in the output corresponding to an increase in a reference voltage of the first exhaust oxygen sensor from a lower voltage state to the higher voltage state, and subtracting the output change from the output. Additionally or alternatively, the engine system may further comprise a second exhaust oxygen sensor disposed in the exhaust passage of the engine, wherein correcting the output of the first exhaust oxygen sensor further comprises correcting the output based on an output of a second exhaust oxygen sensor. Additionally or alternatively, the first exhaust oxygen sensor may comprise a UEGO sensor and the second exhaust oxygen sensor comprises a HEGO sensor.

In this way, the systems and method described herein may increase the accuracy of estimations of the air-fuel ratio during operation of an exhaust gas oxygen sensor in a variable voltage mode where the sensor is adjusted between a lower first voltage state less than a threshold voltage and a second higher voltage state higher than a threshold voltage. Specifically, the accuracy of the air-fuel ratio may be increased when the oxygen sensor is operating at a reference voltage high enough to dissociate water vapor and/or carbon dioxide. The oxygen sensor may adjusted between a lower first reference voltage at which water vapor and carbon dioxide are not dissociated and a higher second voltage at which water vapor and optionally carbon dioxide are dissociated. When operating at the higher second voltage, outputs of the oxygen sensor in the form of a pumping current (Ip) may become corrupt due to contributions to the oxygen concentration from dissociated water vapor and/or carbon dioxide. The air-fuel ratio may be estimated by comparing the pumping current of the oxygen sensor to an output of the oxygen sensor during a non-fueling event such as during deceleration fuel shut-off (DFSO). Thus, the accuracy of the air-fuel estimates may be affected by the accuracy of the oxygen sensor. As such, air-fuel ratio estimates may be reduced when the oxygen sensor operates at its higher second reference voltage. The controller may correct a pumping current of the exhaust oxygen sensor operating in variable voltage mode by subtracting a change in the pumping current corresponding to the increase in the reference voltage above the threshold voltage. Furthermore, the controller may correct an air-fuel ratio estimate based on the first exhaust oxygen sensor based on an air-fuel ratio estimate based on a second exhaust oxygen sensor. In this way, the accuracy of air-fuel estimates based on the exhaust gas sensor can be preserved, and closed loop fuel control of the engine can be maintained even when the exhaust oxygen sensor is operating VVS mode, thereby reducing engine emissions, increasing fuel economy, and increasing vehicle drivability.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
operating a first exhaust oxygen sensor in a variable voltage mode, including modulating a reference voltage of the first exhaust oxygen sensor, and responsive to a first condition comprising the reference voltage of the first exhaust oxygen sensor increasing above a threshold voltage,
determining a change in an output of the first exhaust oxygen sensor corresponding to the increase in the reference voltage,
correcting the output of the first exhaust oxygen sensor based on the output change, and
adjusting engine operation based on the corrected output.

2. The method of claim 1, wherein adjusting engine operation based on the corrected output comprises determining an air-fuel ratio based on the corrected output and adjusting engine operation based on the air-fuel ratio.

3. The method of claim 2, further comprising, responsive to the increase in the reference voltage, correcting the output of the first exhaust oxygen sensor based on an output of a second exhaust oxygen sensor.

4. The method of claim 3, wherein the first condition further comprises a pumping current of the first exhaust oxygen sensor increasing above a threshold current.

5. The method of claim 4, further comprising, during operation of the first exhaust oxygen sensor in the variable voltage mode, controlling the engine in a closed loop manner based on the air-fuel ratio, and, responsive to the increase in the reference voltage, maintaining closed loop control of the engine based on the air-fuel ratio.

6. The method of claim 5, wherein the threshold voltage comprises a voltage above which exhaust water or exhaust carbon dioxide is dissociated at the first oxygen sensor.

7. The method of claim 6, wherein the second exhaust oxygen sensor is positioned downstream from the first exhaust oxygen sensor.

8. The method of claim 7, wherein the first exhaust oxygen sensor is positioned upstream from an emissions control device.

9. The method of claim 1, wherein correcting the output of the first oxygen sensor based on the output change comprises subtracting the change in the output from the output.

10. A method, comprising:
during operation of a combustion engine in a closed loop control mode based on an air-fuel ratio,
operating a first exhaust oxygen sensor in a variable voltage mode, including modulating a reference voltage of the first exhaust oxygen sensor,
correcting an output of the first exhaust oxygen sensor operating in the variable voltage mode, and
determining the air-fuel ratio based on the corrected output of the first exhaust oxygen sensor.

11. The method of claim 10, further comprising correcting the output of the first exhaust oxygen sensor while the reference voltage of the first exhaust oxygen sensor is in a higher voltage state.

12. The method of claim 11, wherein correcting the output of the first exhaust oxygen sensor comprises determining a change in the output corresponding to an increase in the reference voltage of the first exhaust oxygen sensor from a lower voltage state to the higher voltage state, and subtracting the output change from the output.

13. The method of claim 12, wherein correcting the output of the first exhaust oxygen sensor further comprises correcting the output based on an output of a second exhaust oxygen sensor.

14. The method of claim 13, wherein the first exhaust oxygen sensor is positioned upstream from the second exhaust oxygen sensor.

15. The method of claim 14, wherein the higher voltage state corresponds to a voltage at which exhaust water or exhaust carbon dioxide dissociates to oxygen.

16. An engine system, comprising:
an engine;
a first exhaust oxygen sensor positioned at an exhaust passage of the engine; and
a controller, including executable instructions to,
during operation of the engine in a closed loop control mode based on an air-fuel ratio,
operate the first exhaust oxygen sensor in a variable voltage mode, including modulating a reference voltage of the first exhaust oxygen sensor,
correct an output of the first exhaust oxygen sensor operating in the variable voltage mode, and
determine the air-fuel ratio based on the corrected output of the first exhaust oxygen sensor.

17. The engine system of claim 16, wherein the executable instructions further comprise correcting the output of the first exhaust oxygen sensor while the reference voltage of the first exhaust oxygen sensor is in a higher voltage state.

18. The engine system of claim 17, wherein correcting the output of the first exhaust oxygen sensor comprises determining a change in the output corresponding to an increase in the reference voltage of the first exhaust oxygen sensor from a lower voltage state to the higher voltage state, and subtracting the output change from the output.

19. The engine system of claim 18, further comprising a second exhaust oxygen sensor disposed in the exhaust passage of the engine, wherein correcting the output of the first exhaust oxygen sensor further comprises correcting the output based on an output of the second exhaust oxygen sensor.

20. The engine system of claim 19, wherein the first exhaust oxygen sensor comprises a UEGO sensor and the second exhaust oxygen sensor comprises a HEGO sensor.

* * * * *